(12) United States Patent
Chen et al.

(10) Patent No.: US 10,697,738 B2
(45) Date of Patent: Jun. 30, 2020

(54) COMPOSITE BALLISTIC-RESISTANT UNIT MATERIAL AND PREPARATION METHOD FOR SAME

(71) Applicant: BEIJING TONGYIZHONG SPECIALTY FIBRE TECHNOLOGY & DEVELOPMENT CO., LTD, Beijing (CN)

(72) Inventors: Zhenkun Chen, Beijing (CN); Xingliang Huang, Beijing (CN); Xiangyang Feng, Beijing (CN)

(73) Assignee: BEIJING TONGYIZHONG SPECIALTY FIBRE TECHNOLOGY & DEVELOPMENT CO., .TD, Beijing (CN)

( * ) Notice: Subject to any disclaimer, the term of this patent is extended or adjusted under 35 U.S.C. 154(b) by 471 days.

(21) Appl. No.: 15/120,979

(22) PCT Filed: Apr. 8, 2014

(86) PCT No.: PCT/CN2014/074877
§ 371 (c)(1),
(2) Date: Aug. 23, 2016

(87) PCT Pub. No.: WO2015/127708
PCT Pub. Date: Sep. 3, 2015

(65) Prior Publication Data
US 2016/0377387 A1    Dec. 29, 2016

(30) Foreign Application Priority Data
Feb. 28, 2014    (CN) .......................... 2014 1 0073642

(51) Int. Cl.
*F41H 5/04*    (2006.01)
*B32B 5/12*    (2006.01)
(Continued)

(52) U.S. Cl.
CPC ............. *F41H 5/0485* (2013.01); *B32B 5/12* (2013.01); *B32B 5/26* (2013.01); *B32B 7/12* (2013.01);
(Continued)

(58) Field of Classification Search
CPC ............ B32B 2255/02; B32B 2255/26; B32B 2262/0253; B32B 2262/0269;
(Continued)

(56) References Cited

U.S. PATENT DOCUMENTS 7,148,162 B2    12/2006    Park et al.
7,378,147 B2    5/2008    Twomey et al.
(Continued)

FOREIGN PATENT DOCUMENTS

CN    101749983 A    6/2010
CN    101881582 A    11/2010
(Continued)

OTHER PUBLICATIONS

Extended European Search Report regarding Application No. 14883869.1 (PCT/CN2014/074877) dated Jan. 19, 2018.
(Continued)

*Primary Examiner* — Arti Singh-Pandey
(74) *Attorney, Agent, or Firm* — Harness, Dickey & Pierce, P.L.C.

(57) ABSTRACT

Provided is a composite ballistic-resistant unit material, formed of an intersecting composite of N two layer structured units, 1≤N≥8, an organic thin film being attached to two sides thereof, the angle of intersection of each adjacent layer being 45°-90°; a first layer is a ballistic-resistant fibre unidirectional tape covered in a first resin adhesive, a second layer is a ballistic-resistant fibre unidirectional tape covered in a second resin adhesive, the tensile modulus of the first resin adhesive being lower than 6 MPa, and the tensile
(Continued)

modulus of the second resin adhesive being higher than 6 MPa; the loss modulus of the first resin adhesive and the second resin adhesive, under the same conditions as the test frequency and strain value, at 30-40° C. is the same as the loss modulus of the ballistic-resistant fibre. When the strain sensitive rate of the ballistic-resistant fibre is at $2.4 \times 10^3$ $s^{-1}$, the dynamic tensile stress is at least 2.4 GPa, and the sound-wave conduction speed is at least 10000 m/s. The composite ballistic-resistant unit material uses two kinds of resin adhesive, respectively coated onto adjacent layers, and the softness and hardness of ballistic-resistant materials produced therewith is appropriate, having excellent ballistic-resistant performance.

14 Claims, 1 Drawing Sheet

(51) Int. Cl.
*B32B 5/26* (2006.01)
*B32B 7/12* (2006.01)

(52) U.S. Cl.
CPC ....... *B32B 2255/02* (2013.01); *B32B 2255/26* (2013.01); *B32B 2262/0253* (2013.01); *B32B 2262/0269* (2013.01); *B32B 2307/518* (2013.01); *B32B 2307/558* (2013.01); *B32B 2571/00* (2013.01); *B32B 2571/02* (2013.01)

(58) Field of Classification Search
CPC ....... B32B 2307/518; B32B 2307/558; B32B 2571/00; B32B 2571/02; B32B 5/12; B32B 5/26; B32B 7/12; F41H 5/0485
See application file for complete search history.

(56) References Cited

U.S. PATENT DOCUMENTS

| | | | |
|---|---|---|---|
| 8,420,202 B2 | 4/2013 | Yang et al. | |
| 9,138,961 B2* | 9/2015 | Bhatnagar | D01G 25/00 |
| 9,296,875 B2 | 3/2016 | He et al. | |
| 9,469,939 B2* | 10/2016 | Ardiff | F41H 5/0478 |
| 2005/0197020 A1 | 9/2005 | Park et al. | |
| 2011/0256339 A1 | 10/2011 | Yang et al. | |
| 2012/0156952 A1* | 6/2012 | Ardiff | F41H 5/0478 442/135 |
| 2012/0295057 A1* | 11/2012 | Atorrasagasti | F41H 5/0478 428/101 |
| 2013/0143987 A1 | 6/2013 | He et al. | |
| 2013/0219600 A1 | 8/2013 | Atorrasagasti et al. | |
| 2015/0323292 A1* | 11/2015 | Strauss | F41H 5/0485 89/36.02 |

FOREIGN PATENT DOCUMENTS

| | | |
|---|---|---|
| CN | 102490416 A | 6/2012 |
| CN | 102519309 A | 6/2012 |
| CN | 202648533 U | 1/2013 |
| EP | 1574811 A1 | 9/2005 |
| EP | 1694888 B1 | 10/2006 |
| EP | 2610374 A1 | 7/2013 |
| WO | WO-2009008922 A2 | 1/2009 |
| WO | WO-2013008178 A1 | 1/2013 |

OTHER PUBLICATIONS

International Search Report (English and Chinese), ISA/CN, Haidian District, Beijing, dated Nov. 26, 2014.
Written Opinion of the ISA (Chinese), ISA/CN, Haidian District, Beijing, dated Nov. 26, 2014.

* cited by examiner

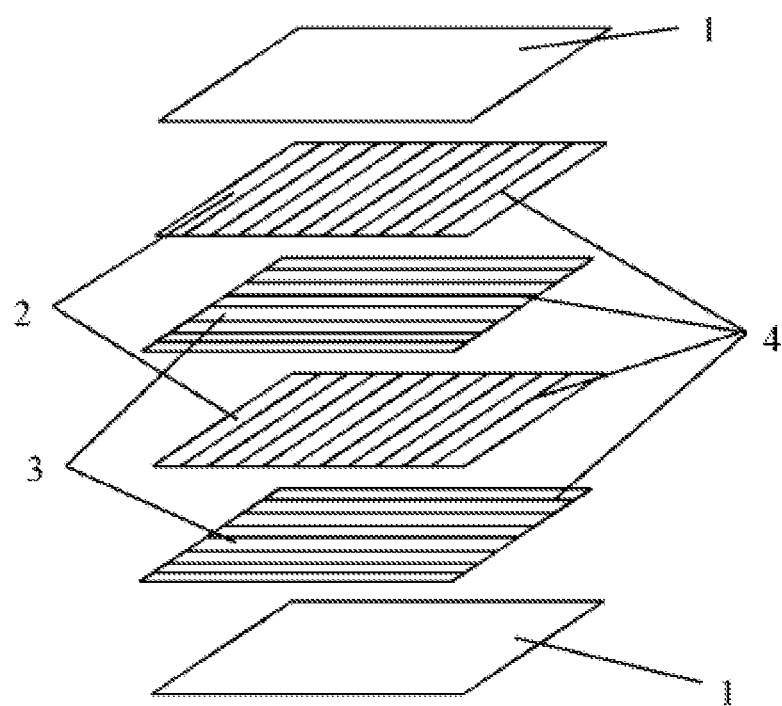

COMPOSITE BALLISTIC-RESISTANT UNIT MATERIAL AND PREPARATION METHOD FOR SAME

CROSS REFERENCE OF RELATED APPLICATIONS

The present application is a 371 U.S. National Stage of International Application No. PCT/CN2014/074877, filed Apr. 8, 2014 which claims the priority of Chinese patent application No. 201410073642.4, entitled "COMPOSITE BALLISTIC-RESISTANT UNIT MATERIAL AND PREPARATION METHOD FOR SAME" filed with the Chinese State Intellectual Property Office on Feb. 28, 2014, both of which are incorporated herein by reference in their entirety.

FIELD

The present invention relates to material field, and particularly relates to a composite ballistic-resistant unit material and preparation method for the same.

BACKGROUND

A ballistic-resistant material is a composite based on a high-strength and high-modulus fiber, and is generally applied in individual protection, such as body armors. The ballistic-resistant material is mainly classified as soft and hard ballistic-resistant materials, which have different ballistic-resistant mechanisms. The hard ballistic-resistant material mainly utilizes its hardness to alter the shape of a bullet or fragment, thereby reducing the kinetic energy thereof and producing a ballistic-resistant effect, while the soft ballistic-resistant material mainly utilizes the deformation of the soft ballistic-resistant material to produce a buffering effect, to absorb the kinetic energy of a bullet or fragment shot thereon, thereby achieving the ballistic-resistant purpose.

The ballistic-resistant material may have a structure composed of unidirectional high-strength and high-modulus fibers, such as high-strength and high-modulus polyethylene fibres or aramid fibres. Such a ballistic-resistant material has a ballistic-resistant performance to some extent; however, since the resin adhesive used in each layer of the ballistic-resistant material is a single resin system, the ballistic-resistant material is either too soft, which makes the material easily be penetrated when subjected to the breakthrough of a steel core bullet; or is too hard, which makes the wearer feel uncomfortable.

U.S. Pat. No. 7,378,147 has disclosed using a dynamic mechanical analysis (DMA) test method to test the loss modulus of polyethylene yarns. The dynamic mechanical analysis is a technology of applying a dynamic stress or strain to a sample and analyzing the response so as to obtain mechanical performances such as a storage modulus (E'), loss modulus (E") and damping (tan δ) as a function of the temperature and/or frequency.

The storage modulus is a capability that a material is able to store the energy applied thereon for further use or for use during rebound deformation. The loss modulus is a capability that a material is able to dissipate the energy applied thereon, for example, the energy lost due to failure to return to its original shape after plasticine being stretched. The tan δ is a ratio of the storage modulus to the loss modulus.

For the test on the loss modulus in U.S. Pat. No. 7,378,147, a peak value of the loss modulus was obtained at a frequency of 10 or 100 radians/second, within a temperature range of −150° C. to 125° C. and under a strain value of 0.025±0.005%.

Although the loss modulus of a ballistic-resistant fibre is associated with the ballistic-resistant performance, there has been no report on the correlation between its loss modulus and the loss modulus of a resin adhesive.

SUMMARY

An object of the present invention is to provide a soft composite ballistic-resistant unit material, such that the soft composite ballistic-resistant unit material has a suitable hardness and improved ballistic-resistant performances.

The composite ballistic-resistant unit material provided in the present invention is formed of an intersecting composite of N two-layer structured unit layers, 1≤N≤8, an organic thin film being attached to two sides thereof, the angle of intersection of each adjacent layer being 45°-90°; in which a first layer is a ballistic-resistant fibre unidirectional tape coated by a first resin adhesive, a second layer is a ballistic-resistant fibre unidirectional tape coated by a second resin adhesive, wherein the tensile modulus of the first resin adhesive is lower than 6 MPa, and the tensile modulus of the second resin adhesive is higher than 6 MPa; the loss modulus of the first resin adhesive and the second resin adhesive being the same as the loss modulus of the ballistic-resistant fibre at 30-40° C., under the same conditions of the test frequency and strain value.

In the present invention, by adjusting the loss modulus of the resin adhesive to be the same as the loss modulus of the ballistic-resistant fibre at 30-40° C. under the same conditions (the same test frequency and strain value), better performances are obtained for the ballistic-resistant composite.

Preferably, 1≤N≤6, and more preferably 2≤N≤4.

Preferably, when the strain sensitive rate of the ballistic-resistant fibre is $2.4 \times 10^3$ $s^{-1}$, the dynamic tensile stress is at least 2.4 GPa, preferably at least 2.8 GPa.

Preferably, when the strain sensitive rate of the ballistic-resistant fibre is $2.4 \times 10^3$ $s^{-1}$, the ratio of the dynamic to static elastic modulus is ≥1.3.

Preferably, the ballistic-resistant fibre has a tensile strength of no less than 22 cN/dtex, preferably no less than 30 cN/dtex, further preferably no less than 32 cN/dtex; and a tensile modulus of no less than 750 cN/dtex, preferably no less than 1000 cN/dtex, further preferably no less than 1200 cN/dtex.

Preferably, the ballistic-resistant fibre is selected from a high-strength and high-modulus polyethylene fibre, an aramid fibre or PBO fibre.

Preferably, the ballistic-resistant fibre has a sound speed of at least 10000 m/s. More preferably, the ballistic-resistant fibre has a sound speed of at least 11000 m/s.

Preferably, the first resin adhesive has a tensile modulus of less than 3 MPa.

More preferably, the second resin adhesive has a tensile modulus of more than 8 MPa.

Preferably, the organic thin film is selected from a low-density polyethylene film, ultra-high molecular weight polyethylene film, biaxially oriented polyethylene film or polyester film.

Preferably, the total areal density of the composite ballistic-resistant unit material as described in the present invention is ≤400 g/m²; preferably the total areal density is ≤200 g/m²; the fibre content is at least 70%, preferably 72%, most preferably 75%.

Since the composite ballistic-resistant unit material as described in the present invention has a strain rate of above $10^3$ $s^{-1}$ order of magnitudes in a ballistic-resistant test, it is necessary to test the strain sensitivity of a fibre bundle within a range of high strain rates $\dot{\varepsilon}=0.1\sim3.0\times10^3$ $s^{-1}$. Preferably, when the strain rate is at $2.4\times10^3$ $s^{-1}$, the fibre bundle has a dynamic tensile stress of $\geq2.4$ GPa, a dynamic strain of $\geq2.0\%$ and a ratio of the dynamic to static elastic modulus of 1.3.

The present invention provides a composite ballistic-resistant unit material of a unidirectional high-strength and high-modulus fibre-reinforced resin, which balances the requirements regarding the ballistic-resistant performances and comfort.

According to the present invention, a method for preparation of a composite ballistic-resistant unit material is further provided, which comprises:

1) preparing a first layer which is a ballistic-resistant fibre unidirectional tape coated by a first resin adhesive;

2) preparing a second layer which is a ballistic-resistant fibre unidirectional tape coated by a second resin adhesive;

3) roll compacting the first layer and the second layer into one unit layer with the angle of intersection of each adjacent layer being 45°-90°, bonding N unit layers together and attaching an organic thin film to two sides thereof.

Preferably, the composite ballistic-resistant unit material comprises N unit layers, in which $1\leq N\leq 8$, preferably $1\leq N\leq 6$, and most preferably $2\leq N\leq 4$; as well as a total areal density of $\leq 400$ g/m².

The multi-layered composite ballistic-resistant unit material as provided in the present invention uses two kinds of resin adhesives, which are respectively coated onto adjacent layers, and the ballistic-resistant material produced thereby has appropriate softness and hardness, and also has excellent ballistic-resistant performances.

BRIEF DESCRIPTION OF THE FIGURE

FIG. 1 is a structural schematic diagram of the composite ballistic-resistant unit material of the present invention, in which 1 represents an organic thin film, 2 represents a first resin adhesive, 3 represents a second resin adhesive and 4 represents ballistic-resistant fibres.

DETAILED DESCRIPTION

The present invention discloses an electrochemiluminescence immunoassay method, and such a method can be embodied by those skilled in the art with suitable improvement on process parameters by reference to the content herein. It is particularly to be indicated that, all of the similar substitutions and modifications are obvious for those skilled in the art, and are deemed to be included in the present invention. The method and application of the present invention have been disclosed by way of preferred examples, and those skilled in the art can obviously make modifications or appropriate alterations and combinations to the method and application described herein so as to achieve and apply the technology of the present invention, without departing from the content, spirit and scope of the present invention.

For better understanding of the technical solutions of the present invention for those skilled in the art, further detailed description will be made in conjunction with specific examples hereinafter.

An object of the present invention is to provide a composite ballistic-resistant unit material, which at least comprises a first unidirectionally oriented ballistic-resistant fibre layer and a second unidirectionally oriented ballistic-resistant fibre layer, in which the fibre used is a high-strength and high-modulus fibre, and in which the difference between adjacent fibre layers is the resin adhesives used being different.

The ballistic-resistant fibre in the present invention is a high-strength and high-modulus fibre, which has a tensile strength of no less than 22 cN/dtex, preferably no less than 30 cN/dtex, further preferably no less than 32 cN/dtex; and a tensile modulus of no less than 750 cN/dtex, preferably no less than 1000 cN/dtex, further preferably no less than 1200 cN/dtex.

The high-strength and high-modulus fibre in the present invention includes an aramid fibre, a high-strength and high-modulus polyethylene fibre, a PBO fibre, a M5 fibre, preferably an aramid fibre and a high-strength and high-modulus polyethylene fibre. The high-strength and high-modulus polyethylene fibre in the present invention refers to a polyethylene fibre having a molecular weight of no less than 1,000,000, preferably 1,000,000 to 5,000,000, and a tensile modulus of no less than 750 cN/dtex.

Patents EP 1694888B1 and EP 2610374 A1 have disclosed a spinning preparation method of such a high-strength and high-modulus polyethylene fibre, which is incorporated herein as reference.

Preferably, when the strain sensitive rate of the high-strength and high-modulus fibre is $2.4\times10^3$ $s^{-1}$, the dynamic tensile stress is $\geq2.4$ Gpa; and most preferably, when the strain sensitive rate of the high-strength and high-modulus fibre is $2.4\times10^3$ $s^{-1}$, the dynamic tensile stress is $\geq2.8$ GPa.

Preferably, the high-strength and high-modulus fibre has a sound speed of at least 10000 m/s; and most preferably, the high-strength and high-modulus fibre has a sound speed of at least 11000 m/s.

The composite ballistic-resistant unit material of the present invention has a fibre content of at least 70%, preferably 72%, most preferably 75%.

The first layer and second layer are formed of unidirectionally oriented ballistic-resistant fibres.

The first layer and second layer can be formed by various methods. Preferably, the ballistic-resistant fibres are unwound from a thread holder and passed through parallel arranged steel needles under drag with a dragger, to allow the fibres parallel and uniformly spread and arrange at regular intervals within a certain width, and then quantified dipping is completed with a dip tank and a squeegee device. The dipped fibre unidirectional tape is heated and dried through hot wind in a wind tube and finally is wound.

The resin adhesives used during the dipping of the present invention includes two kinds of different resin systems. The resin system may be thermoplastic resin, thermosetting resin or a mixture thereof. In an embodiment, the thermoplastic resin in the first layer has a tensile modulus of less than 6 MPa, and the thermoplastic resin in the second layer has a tensile modulus of more than 6 MPa. Preferably, the thermoplastic resin in the first layer has a tensile modulus of less than 3 MPa, and the thermoplastic resin in the second layer has a tensile modulus of more than 8 MPa.

Preferably, the loss modulus of the thermoplastic resin in the first and second layers is essentially the same as the loss modulus of the ballistic-resistant fibre at 30-40° C. under the same conditions. The loss modulus is obtained by an instrument Rheometrics Solids Analyzer Model RSA-3.

The adjustment approach regarding the loss modulus of the thermoplastic resin can be achieved by adjusting such as the cross-linking degree of the resin or increasing viscosity of the resin.

Preferably, the thermoplastic resin in the first layer comprises one or more of natural rubbers, polyacrylates and ethylene vinyl acetate copolymers.

Preferably, the thermoplastic resin in the second layer comprises one or more of polyurethanes and polyvinyl alcohols.

The first and second layers are orthogonally composited into one unit layer by a roll compacting, preferably wound to a coil, in which a release film can serve to avoid the bonding phenomenon occurring during the winding.

As described above, multiple layers can be composited into a composite layer. For example, a four-layer structure can be formed, in which two unidirectionally oriented fibre layers comprising a first resin adhesive are bonded together to form an internal layer of the structure, and two unidirectionally oriented fibre layers comprising a second resin adhesive are bonded together to form an external layer of the structure.

Alternatively, a four-layer structure can be formed, in which two unidirectionally oriented fibre layers comprising a first resin adhesive and a second resin adhesive respectively are bonded together. The structure bonded together either has two identical unidirectionally oriented fibre layers, or has two different unidirectionally oriented fibre layers.

In a similar manner, a six-layer, or eight-layer, or ten-layer or twelve-layer structure can be obtained by orthogonally compositing multiple unidirectionally oriented unit layers. Regardless of the numbers of the layers of the composite ballistic-resistant unit material, they can be bonded together with each other by consolidation. Consolidation refers to melting both the resin adhesive and fibre into one unit layer. The consolidation can be achieved by drying, cooling, heating, pressurizing or a combination thereof.

One or more kinds of plastic films are attached to two sides of the composite ballistic-resistant unit material, to facilitate sliding between the composite ballistic-resistant unit materials, so as to increase the wear resistance of the body armor prepared thereby, or for other reasons. Any suitable plastic film, such as a low-density polyethylene film, ultra-high molecular weight polyethylene film, biaxially oriented polyethylene film, polyester film or the like, can be used. The typical thickness of these films is between 3 and 20 μm, preferably between 3 and 10 μm, and most preferably between 3 and 8 μm. The most preferred plastic film is the low-density polyethylene film.

Considering the comfort of the layered ballistic-resistant material, the orthogonal composite ballistic-resistant unit has an areal density of ≤400 g/m²; preferably, the orthogonal composite ballistic-resistant unit has an areal density of ≤200 g/m².

The composite ballistic-resistant unit material of the present invention has very extensive uses, such as components, structural articles of ballistic-resistant articles, vehicular armors and aerial armors, preferably for use in soft or hard ballistic-resistant articles, such as body armors, armor linings.

In order to further understand the present invention, preferred embodiments of the present invention are described in conjunction with examples hereinafter. However, it is to be understood that, these particular technologies, conditions, materials as well as reported data are only for further illustrating features and advantages of the present invention, rather than limiting the scope of claims of the present invention.

Comparative Example 1

A high-strength and high-modulus polyethylene fibre of FT123 fibre, 800 d/528 f (with a strength of 32 cN/dtex, a tensile modulus of 1250 cN/dtex, a dynamic tensile stress of ≥2.8 GPa when the strain sensitive rate is at $2.4 \times 10^3$ s$^{-1}$, and a sound speed of 11000 m/s) was unwound from a bobbin creel and passed through parallel arranged steel needles under drag with a dragger, to allow the fibres parallel and uniformly spread and arrange at regular intervals within a certain width, and then the fibre was passed through a dip tank comprising an acrylic resin adhesive (with the resin having a tensile modulus of 2 MPa) and a squeegee device, to complete quantified dipping. The dipped fibre unidirectional tape was heated and dried through hot wind in a wind tube, and finally wound to form a unidirectional fibre tape. The unidirectional fibre tape had an areal density of 35 g/m² and a fibre content of 75%.

A coil of the unidirectional fibre tape comprising the acrylic resin adhesive was used as a continuous sheet, and another coil of the unidirectional fibre tape comprising the acrylic resin adhesive was cut into sections with the same width as the continuous sheet. The sections were then laminated onto the continuous sheet, in turn to consolidate into an orthogonal composite ballistic-resistant unit material through a bonder under heat and pressure, onto both sides of which a low-density polyethylene thin film (with a thickness of 5 μm, 5 g/m²) was attached during the second thermal compositing. The consolidated composite ballistic-resistant unit material was wound to a continuous roll material with a certain length.

A sample of a ballistic-resistant panel was prepared by cutting the composite ballistic-resistant unit material into a 40×40 cm square sheet and then laminating onto a target sheet with an areal density of 4.0 kg/m². The V50 value thereof against 9 mm full metal jacket was investigated. As a result, the ballistic-resistant panel consisting of such a composite ballistic-resistant unit material meets the requirements.

Comparative Example 2

Comparative example 1 was repeated, except that the acrylic resin adhesive of Comparative example 1 was replaced with a polyurethane resin adhesive with a tensile modulus of 8 MPa. An orthogonal material comprising such a polyurethane resin adhesive was consolidated an orthogonal composite ballistic-resistant unit material through a bonder under heat and pressure, and the consolidated composite ballistic-resistant unit material was wound to a continuous roll material with a certain length.

A sample of a ballistic-resistant panel was prepared by cutting the composite ballistic-resistant unit material into a 40×40 cm square sheet and then laminating onto a target sheet with an areal density of 4.0 kg/m². The V50 value thereof against 9 mm full metal jacket was investigated. As a result, the ballistic-resistant panel consisting of such a composite ballistic-resistant unit material meets the requirements.

Comparative Example 3

Comparative example 1 was repeated, except that the two-layer orthogonal composite ballistic-resistant unit material of Comparative example 1 was subjected to the orthogonal thermal compositing again, to prepare a four-layer orthogonal composite ballistic-resistant unit material.

A sample of a ballistic-resistant panel was prepared by cutting the composite ballistic-resistant unit material into a 40×40 cm square sheet and then laminating onto a target sheet with an areal density of 4.0 kg/m². The V50 value thereof against 9 mm full metal jacket was investigated. As a result, the ballistic-resistant panel consisting of such a composite ballistic-resistant unit material meets the requirements.

Example 1

A high-strength and high-modulus polyethylene fibre of FT123 fibre, 800 d/528 f (with a strength of 32 cN/dtex, a tensile modulus of 1250 cN/dtex, a dynamic tensile stress ≥2.8 GPa when the strain sensitive rate is at $2.4 \times 10^3$ s$^{-1}$, and a sound speed of 11000 m/s) was unwound from a bobbin creel and passed through parallel arranged steel needles under drag with a dragger, to allow the fibres parallel and uniformly spread and arrange at regular intervals within a certain width, and then the fibre was passed through a dip tank comprising an acrylic resin adhesive and a squeegee device, to complete quantified dipping, wherein the acrylic resin adhesive had a tensile modulus of 5 MPa, whose viscosity and loss modulus were improved with the addition of a rosin tackifying emulsion, making its loss modulus the same as the loss modulus of the ballistic-resistant fibre at 30-40° C. under the same conditions. The dipped fibre unidirectional tape was heated and dried through hot wind in a wind tube, and finally wound to form a unidirectional fibre tape. The unidirectional fibre tape had an areal density of 35 g/m$^2$ and fibre content of 75%.

The acrylic resin adhesive was replaced with a polyurethane resin adhesive with a tensile modulus of 8 MPa, and its loss modulus was adjusted by adding a cross-linking agent, to make it the same as the loss modulus of the ballistic-resistant fibre at 30-40° C. under the same conditions. Thereafter, another unidirectional fibre tape was prepared, with an areal density of 35 g/m$^2$ and fibre content of 75%.

The unidirectional fibre tape comprising the acrylic resin adhesive was used as a continuous sheet, and the unidirectional fibre tape comprising the polyurethane resin adhesive was cut into sections with the same width as the continuous sheet. The sections were then laminated onto the continuous sheet, in turn to consolidate into an orthogonal composite ballistic-resistant unit material through a bonder under heat and pressure, onto both sides of which a low-density polyethylene thin film (with a thickness of 6 μm, 5 g/m$^2$) was attached during the second thermal compositing, with the structure shown in FIG. 1. The consolidated composite ballistic-resistant unit material was wound to a continuous roll material with a certain length.

A sample of a ballistic-resistant panel was prepared by cutting the composite ballistic-resistant unit material into a 40×40 cm square sheet and then laminating onto a target sheet with an areal density of 4.0 kg/m$^2$. The V50 value thereof against 9 mm full metal jacket was tested. Table 2 shows that the ballistic-resistant panel consisting of such a composite ballistic-resistant unit material meets the requirements, and produces better results as compared to Comparative examples 1, 2 and 3.

Example 2

Example 1 was repeated, except that the two-layer orthogonal composite ballistic-resistant unit material of Example 1 was subjected to the orthogonal thermal compositing again, to prepare a four-layer orthogonal composite ballistic-resistant unit material.

A sample of a ballistic-resistant panel was prepared by cutting the composite ballistic-resistant unit material into a 40×40 cm square sheet and then laminating onto a target sheet with an areal density of 4.0 kg/m$^2$. The V50 value thereof against 9 mm full metal jacket were tested. Table 2 shows that the ballistic-resistant panel consisting of such a composite ballistic-resistant unit material meets the requirements, and produces better results as compared to Comparative example 3.

Tables 1 and 2 show relevant parameters of Comparative examples and examples.

TABLE 1

| Fibre | Loss modulus of fibre (10 rad/sm 30-40° C.), GPa | Dynamic tensile stress at a strain rate of $(2.4 \times 10^3$ s$^{-1})$, GPa | Sound speed, m/s |
|---|---|---|---|
| FT123 | 4.4 | 2.8 | 11000 |

TABLE 2

| Example | Loss modulus of fibre (10 rad/sm 30-40° C.), GPa | 9 mm FMJ, V50, m/s |
|---|---|---|
| Comparative Example 1 | 2.3 | 462 |
| Comparative Example 2 | 3.0 | 495 |
| Comparative Example 3 | 2.3 | 478 |
| Example 1 | 4.4 | 542 |
| Example 2 | 4.4 | 564 |

The composite ballistic-resistant unit material provided in the present invention has been described in detail in the foregoing. Particular examples are applied herein to illustrate the principle and embodiments of the present invention, and the description of the examples above is only provided to facilitate understanding on the method of the present invention and the core concept thereof. It is to be indicated that, for those skilled in the art, several improvements and modifications can be further made to the present invention without departing from the principle of the present invention, which also fall within the scope for protection of the claims of the present invention.

What is claimed is:

1. A composite ballistic-resistant unit material, wherein the composite ballistic-resistant unit material is constituted by intersecting compositing of N unit layers each of which is constituted by a two-layer structure, in which 1≤N≤8, an organic thin film is attached to two sides of the N unit layers, the angle of intersection of each adjacent layer being 45°-90°; wherein a first layer is a ballistic-resistant fibre unidirectional tape coated by a first resin adhesive, a second layer is a ballistic-resistant fibre unidirectional tape coated by a second resin adhesive, wherein the tensile modulus of the first resin adhesive is lower than 6 Mpa, and the tensile modulus of the second resin adhesive is higher than 6 Mpa; the loss modulus of the first resin adhesive and the second resin adhesive is the same as the loss modulus of the ballistic-resistant fibre at 30-40° C., under the same conditions of the test frequency and strain value;

wherein the first resin adhesive of the first layer includes a polyacrylate thermoplastic resin;

the second resin adhesive of the second layer includes a polyurethane thermoplastic resin;

the first resin adhesive has a tensile modulus of less than 3 MPa; and the second resin adhesive has a tensile modulus of more than 8 MPa.

2. The composite ballistic-resistant unit material according to claim 1, wherein 1≤N≤6, preferably 2≤N≤4.

3. The composite ballistic-resistant unit material according to claim 1, wherein when the strain sensitive rate of the ballistic-resistant fibre is $2.4\times10^3$ $s^{-1}$, the dynamic tensile stress is at least 2.4 GPa, preferably at least 2.8 GPa.

4. The composite ballistic-resistant unit material according to claim 1, wherein when the strain sensitive rate of the ballistic-resistant fibre is $2.4\times10^3$ $s^{-1}$, the ratio of the dynamic to static elastic modulus is ≥1.3.

5. The composite ballistic-resistant unit material according to claim 1, wherein the ballistic-resistant fibre has a tensile strength of no less than 22 cN/dtex, preferably no less than 30 cN/dtex, further preferably no less than 32 cN/dtex; and a tensile modulus of no less than 750 cN/dtex, preferably no less than 1000 cN/dtex, further preferably no less than 1200 cN/dtex.

6. The composite ballistic-resistant unit material according to claim 1, wherein the ballistic-resistant fibre is selected from a high-strength and high-modulus polyethylene fibre, an aramid fibre or PBO fibre.

7. The composite ballistic-resistant unit material according to claim 1, wherein the ballistic-resistant fibre has a sound speed of at least 10000 m/s.

8. The composite ballistic-resistant unit material according to claim 1, wherein, the ballistic-resistant fibre has a sound speed of at least 11000 m/s.

9. The composite ballistic-resistant unit material according to claim 1, wherein the organic thin film is selected from a low-density polyethylene film, ultra-high molecular weight polyethylene film, biaxially oriented polyethylene film or polyester film.

10. The composite ballistic-resistant unit material according to claim 1, wherein the total areal density is ≤400 g/m$^2$; preferably the total areal density is ≤200 g/m$^2$.

11. The composite ballistic-resistant unit material according to claim 1, wherein the fibre content is at least 70%, preferably 72%, most preferably 75%.

12. A method for preparation of a composite ballistic-resistant unit material according to claim 1, comprising:
　　1) preparing a first layer which is a ballistic-resistant fibre unidirectional tape coated by a first resin adhesive;
　　2) preparing a second layer which is a ballistic-resistant fibre unidirectional tape coated by a second resin adhesive;
　　3) roll compacting the first layer and the second layer into one unit layer with the angle of intersection of each adjacent layer being 45°-90°, so as to bonding N unit layers together and attaching an organic thin film to two sides of the N unit layers.

13. The method according to claim 12, wherein 1≤N≤8, preferably 1≤N≤6, most preferably 2≤N≤4.

14. The method according to claim 12, wherein the total areal density of the composite ballistic-resistant unit material is ≤400 g/m$^2$.

\* \* \* \* \*